United States Patent
Errickson et al.

(10) Patent No.: US 8,762,125 B2
(45) Date of Patent: Jun. 24, 2014

(54) EMULATED MULTI-TASKING MULTI-PROCESSOR CHANNELS IMPLEMENTING STANDARD NETWORK PROTOCOLS

(75) Inventors: Richard K. Errickson, Poughkeepsie, NY (US); Thomas A. Gregg, Highland, NY (US); John S. Houston, Hopewell Junction, NY (US); Ambrose A. Verdibello, Jr., Millbrook, NY (US)

(73) Assignee: International Business Machines Corporation, Armonk, NY (US)

( * ) Notice: Subject to any disclaimer, the term of this patent is extended or adjusted under 35 U.S.C. 154(b) by 290 days.

(21) Appl. No.: 12/036,986

(22) Filed: Feb. 25, 2008

(65) Prior Publication Data

US 2009/0216518 A1 Aug. 27, 2009

(51) Int. Cl.
| | | |
|---|---|---|
| *G06F 9/455* | (2006.01) | |
| *G06F 13/10* | (2006.01) | |
| *G06F 9/54* | (2006.01) | |
| *H04L 12/56* | (2006.01) | |

(52) U.S. Cl.
CPC .............. *G06F 13/105* (2013.01); *G06F 9/544* (2013.01); *G06F 9/546* (2013.01); *H04L 49/901* (2013.01)
USPC .......................................................... 703/23

(58) Field of Classification Search
CPC ....... G06F 13/105; G06F 9/544; G06F 9/546; H04L 49/901
USPC .......................................................... 703/23
See application file for complete search history.

(56) References Cited

U.S. PATENT DOCUMENTS

| | | | |
|---|---|---|---|
| 3,643,227 A | 2/1972 | Smith et al. | |
| 4,993,014 A | 2/1991 | Gordon | |
| 5,170,472 A | 12/1992 | Cwiakala et al. | |
| 5,339,413 A | 8/1994 | Koval et al. | |
| 5,343,867 A | 9/1994 | Shankar | |
| 5,388,266 A | 2/1995 | Frey et al. | |
| 5,452,443 A | 9/1995 | Oyamada et al. | |
| 5,524,212 A | 6/1996 | Somani et al. | |
| 5,764,641 A | 6/1998 | Lin | |
| 5,777,987 A | 7/1998 | Adams et al. | |
| 6,018,515 A | 1/2000 | Sorber | |

(Continued)

OTHER PUBLICATIONS

Wei Huang, Jiuxing Liu, Bulent Abali, and Dhabaleswar Panda, "InfiniBand Support in Xen Virtual Machine Environment", Technical Report, OSU-CISRC-10/05-TR63, Oct. 2005.*

(Continued)

*Primary Examiner* — Omar Fernandez Rivas
*Assistant Examiner* — Angel Calle
(74) *Attorney, Agent, or Firm* — Cantor Colburn LLP; Steven Chiu

(57) ABSTRACT

A computer program product, apparatus and method for emulating channels in a multi-tasking multi-processor environment, including identifying a plurality of physical channels having an associated physical channel identifier for each of the plurality of physical channels, associating an emulated channel from a plurality of emulated channels for each of the plurality of physical channels, thereby generating a plurality of emulated channels, each of the plurality of emulated channels having a virtual channel identifier, mapping the plurality of emulated channels on a communications link, thereby generating an emulated channel path for each of the plurality of emulated channels, defining a queue pair link buffer from a plurality of queue pair link buffers for each of the emulated channels and increasing a number of queue pair link buffers.

20 Claims, 5 Drawing Sheets

(56) References Cited

U.S. PATENT DOCUMENTS

| | | | |
|---|---|---|---|
| 6,073,181 A | 6/2000 | Holland et al. | |
| 6,181,677 B1 | 1/2001 | Valli et al. | |
| 6,185,629 B1 | 2/2001 | Simpson et al. | |
| 6,289,386 B1 | 9/2001 | Vangemert | |
| 6,363,457 B1 | 3/2002 | Sundberg | |
| 6,483,804 B1 | 11/2002 | Muller et al. | |
| 6,507,567 B1 | 1/2003 | Willars | |
| 6,715,055 B1* | 3/2004 | Hughes | 711/170 |
| 6,741,552 B1* | 5/2004 | McCrosky et al. | 370/218 |
| 6,862,609 B2 | 3/2005 | Merkey | |
| 6,993,032 B1 | 1/2006 | Dammann et al. | |
| 7,093,024 B2* | 8/2006 | Craddock et al. | 709/238 |
| 7,200,704 B2 | 4/2007 | Njoku et al. | |
| 7,283,473 B2 | 10/2007 | Arndt et al. | |
| 7,290,077 B2 | 10/2007 | Gregg et al. | |
| 7,366,813 B2 | 4/2008 | Gregg et al. | |
| 7,444,641 B1 | 10/2008 | Diepstraten et al. | |
| 7,467,402 B2 | 12/2008 | Pennington et al. | |
| 7,602,774 B1 | 10/2009 | Sundaresan et al. | |
| 7,613,183 B1 | 11/2009 | Brewer et al. | |
| 2001/0014954 A1 | 8/2001 | Purcell et al. | |
| 2001/0030943 A1* | 10/2001 | Gregg et al. | 370/231 |
| 2002/0091826 A1 | 7/2002 | Comeau et al. | |
| 2002/0107903 A1 | 8/2002 | Richter et al. | |
| 2002/0194245 A1 | 12/2002 | Simpson et al. | |
| 2003/0005039 A1 | 1/2003 | Craddock et al. | |
| 2003/0018828 A1 | 1/2003 | Craddock et al. | |
| 2003/0061379 A1* | 3/2003 | Craddock et al. | 709/238 |
| 2004/0123068 A1 | 6/2004 | Hashimoto | |
| 2004/0154007 A1 | 8/2004 | Koizumi et al. | |
| 2004/0202189 A1 | 10/2004 | Arndt et al. | |
| 2004/0221070 A1 | 11/2004 | Ortega, III et al. | |
| 2005/0018669 A1* | 1/2005 | Arndt et al. | 370/389 |
| 2005/0060374 A1 | 3/2005 | Phillips | |
| 2005/0060445 A1 | 3/2005 | Beukema et al. | |
| 2005/0080933 A1 | 4/2005 | Herring | |
| 2005/0120237 A1 | 6/2005 | Roux et al. | |
| 2005/0144313 A1 | 6/2005 | Arndt et al. | |
| 2006/0048214 A1 | 3/2006 | Pennington et al. | |
| 2006/0176167 A1 | 8/2006 | Dohrmann | |
| 2006/0230185 A1* | 10/2006 | Errickson et al. | 709/250 |
| 2006/0230209 A1 | 10/2006 | Gregg et al. | |
| 2006/0230219 A1 | 10/2006 | Njoku et al. | |
| 2007/0239963 A1 | 10/2007 | Yao et al. | |
| 2007/0245050 A1 | 10/2007 | Gregg et al. | |
| 2008/0028116 A1 | 1/2008 | Gregg et al. | |
| 2008/0109891 A1 | 5/2008 | Greenwald et al. | |
| 2008/0196041 A1 | 8/2008 | Gregg et al. | |
| 2009/0019312 A1 | 1/2009 | Kulkarni et al. | |
| 2009/0094603 A1 | 4/2009 | Hiltgen et al. | |
| 2009/0217238 A1 | 8/2009 | Errickson et al. | |

OTHER PUBLICATIONS

Jiesheng Wu, Abhishek gulati, Bulent Abali, and Dhabaleswar Panda, "Design of an InfiniBand Emulator over Myrinet: Challenges, Implementation, and Performance Evaluation", Technical Report, OSU-CISRC-2/01-TR03, 2003.*

"Infiniband Architecture Specification vol. 1", Release 1.0.a, Jun. 19, 2001, pp. 40, 71, 193-194, 366-370, 665-667.

Non-Final Office Action dated Jan. 29, 2010 for U.S. Appl. No. 12/036,979.

Notice of Allowance dated Jun. 23, 2010 for U.S. Appl. No. 12/036,979.

Non-Final Office Action dated Oct. 1, 2010 ffor U.S. Appl. No. 12/037,046.

Non-Final Office Action dated May 17, 2010 for U.S. Appl. No. 12/037,046.

Office Action made Final dated Oct. 6, 2010 for U.S. Appl. No. 12/037,048.

Non-Final Office Action dated Apr. 9, 2010 for U.S. Appl. No. 12/037,048.

Office Action Made Final dated Aug. 12, 2010 for U.S. Appl. No. 12/051,634.

Non-Final Office Action dated Mar. 22, 2010 for U.S. Appl. No. 12/051,634.

Non-Final Office Action dated May 13, 2010 for U.S. Appl. No. 12/051,631.

Non-Fianl Office Action dated Jun. 1, 2010 for U.S. Appl. No. 12/051,630.

Notice of Allowance dated Oct. 15, 2010 for U.S. Appl. No. 12/051,631.

Final Office dated Nov. 12, 2010 for U.S. Appl. No. 12/051,630.

Non Final Office Action dated Nov. 14, 2011 for U.S. Appl. No. 12/058,034.

Non Final Office Action dated Feb. 8, 2012 for U.S. Appl. No. 12/058,054.

Non Final Office Action dated Dec. 1, 2011 for U.S. Appl. No. 12/051,634.

Non-Final Offica Action dated Jan. 9, 2012 for U.S. Appl. No. 12/051,630.

Office Action Made Final dated Jan. 4, 2012 for U.S. Appl. No. 12/051,628.

Non-Final Offica Action dated Jul. 6, 2011 for U.S. Appl. No. 12/051,628.

Non-Final Office Action dated Mar. 22, 2011 for U.S. Appl. No. 12/036,983.

Notice of Allowance dated Apr. 22, 2011 for U.S. Appl. No. 12/037,046.

Notice of Allowance dated Mar. 9, 2012 for U.S. Appl. No. 12/058,034.

Final Office Action for U.S. Appl. No. 12/051,634—Dated May 9, 2012.

Notice of Allowance dated Feb. 7, 2011 for U.S. Appl. No. 12/036,979.

Notice of Allowance dated Jan. 11, 2011 for U.S. Appl. No. 12/037,048.

Jeong et al.; A study on TCP Buffer Management Algorithim for Improvement on Network Performance in Grid Environment; Jun. 6-9, 2004 pp. 281-288.

Non-Final Office Action dated Aug. 30, 2013 for U.S. Appl. No. 12/051,628.

* cited by examiner

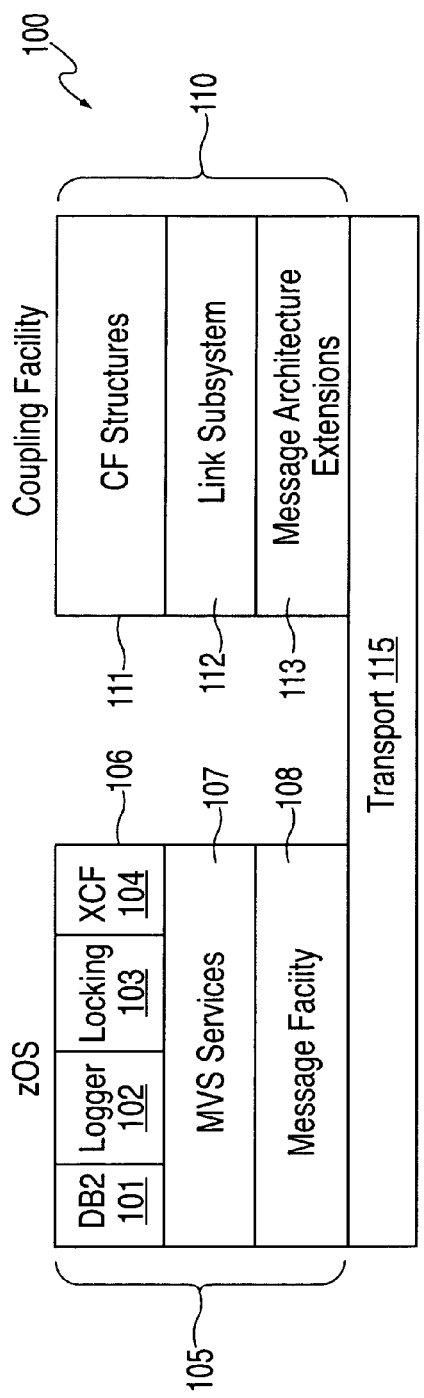
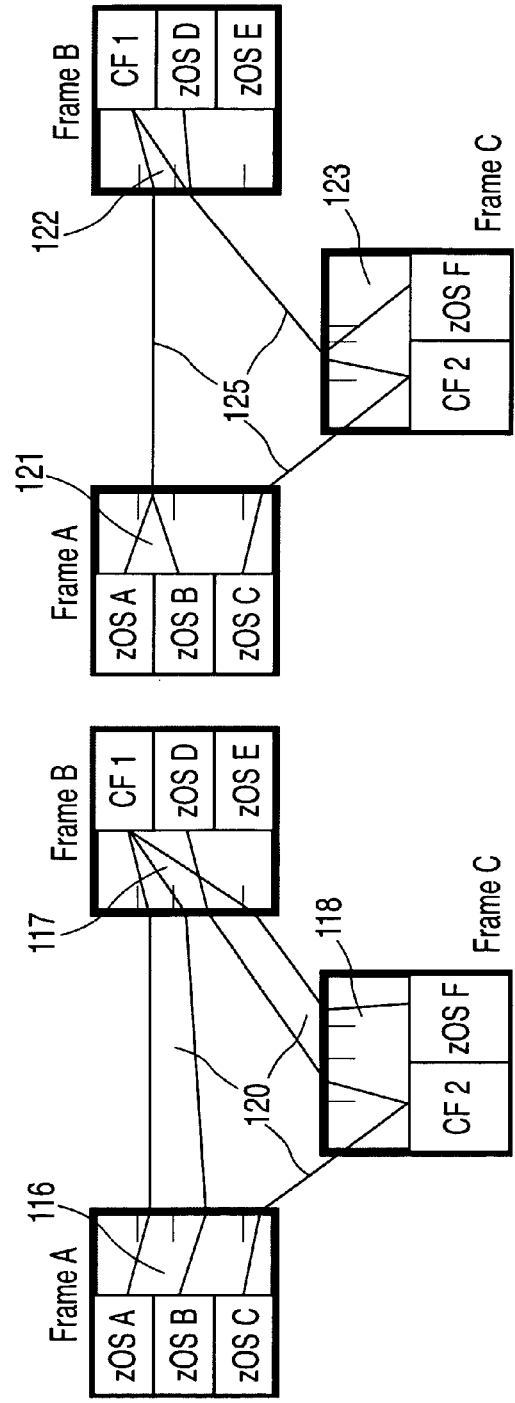
FIG. 1A
FIG. 1B
FIG. 1C

EMULATED MULTI-TASKING MULTI-PROCESSOR CHANNELS IMPLEMENTING STANDARD NETWORK PROTOCOLS

BACKGROUND OF THE INVENTION

1. Field of Invention

The present disclosure relates generally to multi-tasking multiprocessor systems, and in particular, to emulated multi-tasking multi-processor channels implementing standard network protocols.

2. Description of Background

In many mainframe computers, multiple processors are joined into a single unit, sharing the same name and data sets. Such multi-tasking, multi-processor systems represent an instance of a computer system running on one or more physical computers. These multiple mainframes may act as a single mainframe. Such systems can be broken down into LPARs, or logical partitions, each running a different operating system.

InfiniBand (IB), which is a form of System Area Network (SAN), defines a multicast facility that allows a Channel Adapter (CA) to send a packet to a single address and have it delivered to multiple ports. Each multicast group is assigned a unique address, and end-nodes that wish to participate in a multicast group do so via a 'Join' process initiated by the candidate participant with the Subnet Manager. The InfiniBand architecture is described in the InfiniBand standard, which is hereby incorporated by reference.

Currently, multi-tasking multi-processor channels implement proprietary transport protocols (e.g. ISC, ICB). Implementing proprietary transport protocols typically requires unique hardware and software development and also results in customers having to maintain specific networks and connectivity for multi-tasking multi-processor channels. Additionally, the current multi-tasking multi-processor channel types typically allow one channel path per link, necessitating many cables and links to handle both availability and provide bandwidth. By creating an architecture to emulate these channels on standard network protocols, customers have the benefit of standard network equipment use, and lower management costs through fewer links.

BRIEF SUMMARY OF THE INVENTION

An exemplary embodiment includes a computer program product for emulating channels in a multi-tasking multi-processor environment, the computer program product including a tangible storage medium readable by a processing circuit and storing instructions for execution by the processing circuit for performing a method including identifying a plurality of physical channels having an associated physical channel identifier for each of the plurality of physical channels, associating an emulated channel from a plurality of emulated channels for each of the plurality of physical channels, thereby generating a plurality of emulated channels, each of the plurality of emulated channels having a virtual channel identifier, mapping the plurality of emulated channels on a communications link, thereby generating an emulated channel path for each of the plurality of emulated channels, defining a queue pair link buffer from a plurality of queue pair link buffers for each of the emulated channels and in response to an increase of physical channel utilization, increasing a number of queue pair link buffers.

Another exemplary embodiment includes an apparatus for emulating channels in a multi-tasking multi-processor environment, the apparatus including a control unit defined with a channel in the network, the control unit performing a method including identifying a plurality of physical channels having an associated physical channel identifier for each of the plurality of physical channels, associating an emulated channel from a plurality of emulated channels for each of the plurality of physical channels, thereby generating a plurality of emulated channels, each of the plurality of emulated channels having a virtual channel identifier, mapping the plurality of emulated channels on a communications link, thereby generating an emulated channel path for each of the plurality of emulated channels, defining a queue pair link buffer from a plurality of queue pair link buffers for each of the emulated channels and in response to an increase of physical channel utilization, increasing a number of queue pair link buffers.

A further exemplary embodiment includes a method for emulating channels in a multi-tasking multi-processor environment, the method including identifying a plurality of physical channels having an associated physical channel identifier for each of the plurality of physical channels, associating an emulated channel from a plurality of emulated channels for each of the plurality of physical channels, thereby generating a plurality of emulated channels, each of the plurality of emulated channels having a virtual channel identifier, mapping the plurality of emulated channels on a communications link, thereby generating an emulated channel path for each of the plurality of emulated channels, defining a queue pair link buffer from a plurality of queue pair link buffers for each of the emulated channels and in response to an increase of physical channel utilization, increasing a number of queue pair link buffers.

Other articles of manufacture, apparatuses, and/or methods according to embodiments will be or become apparent to one with skill in the art upon review of the following drawings and detailed description. It is intended that all such additional articles of manufacture, apparatuses, and/or methods be included within this description, be within the scope of the present invention, and be protected by the accompanying claims.

BRIEF DESCRIPTION OF THE DRAWINGS

The subject matter which is regarded as the invention is particularly pointed out and distinctly claimed in the claims at the conclusion of the specification. The foregoing and other objects, features, and advantages of the invention are apparent from the following detailed description taken in conjunction with the accompanying drawings in which:

DETAILED DESCRIPTION OF THE INVENTION

In accordance with an aspect of the present invention, the behavior of the multi-tasking multi-processor channels is preserved while implementing standard network protocols. In an exemplary embodiment, the methods and systems described herein map multiple channels on a single link to exploit the continually increasing bandwidth offered by the protocols, and map channel buffers to queue pairs. As such, the systems and methods described herein preserve the data structures and the architectural interface associated with the multi-tasking multi-processor channels, simplifying coexistence and migration for software updates, while adding switched network support. In an exemplary embodiment, hardware channel protocols are emulated via firmware running over a standardized transport.

Figure 1D:
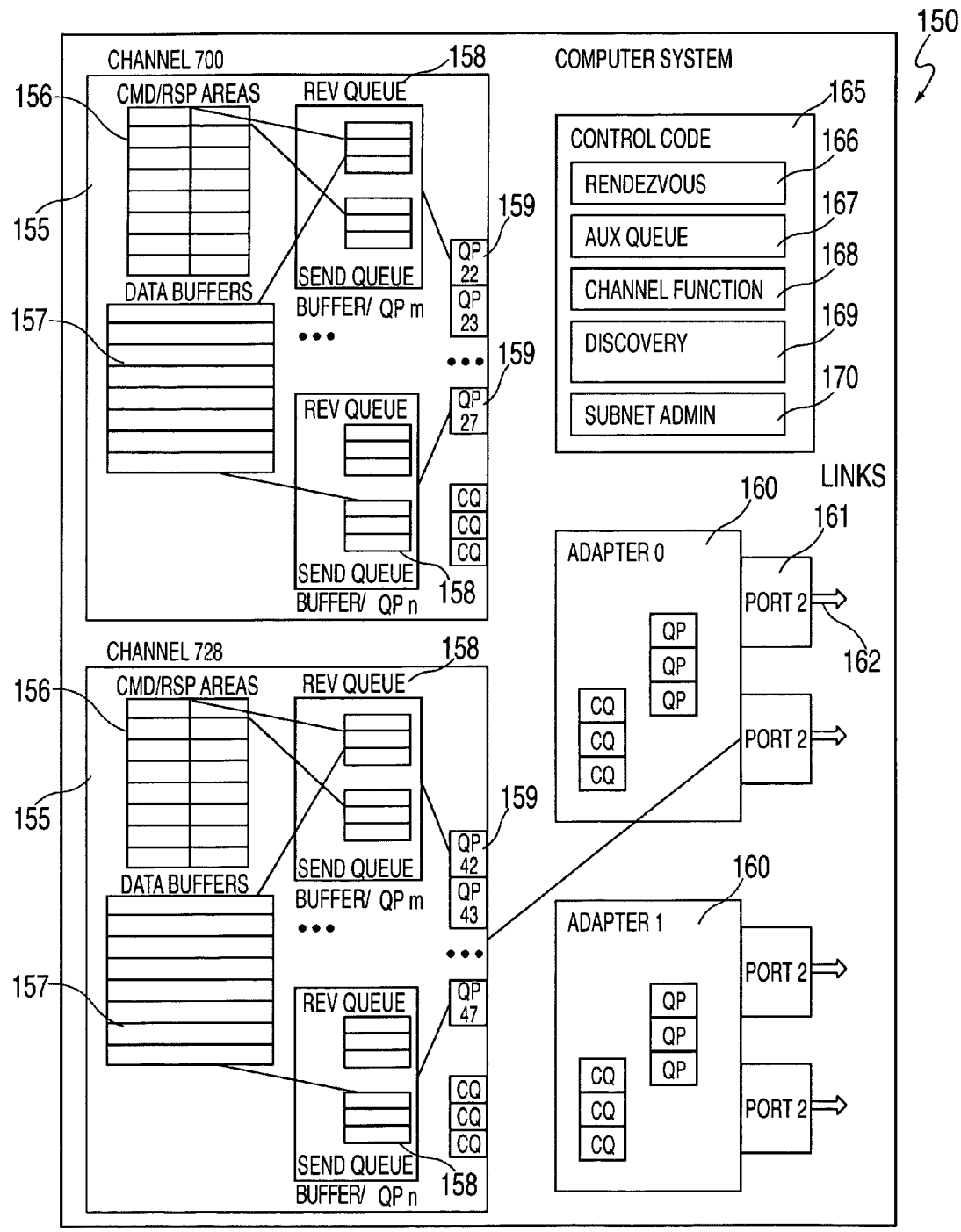
FIG. 1A illustrates an exemplary embodiment of a multi-tasking multi-processor InfiniBand system.
FIG. 1B illustrates an example of a multi-tasking multi-processor environment.
FIG. 1C illustrates an example of a multi-tasking multi-processor environment in accordance with an exemplary embodiment.
FIG. 1 D illustrates an example of a multi-tasking multi-processor environment in accordance with an exemplary embodiment.

FIG. 1A illustrates an exemplary embodiment of a multi-tasking multi-processor InfiniBand system 100. The system 100 can include an operating system 105 (e.g., IBM zOS) having a top layer including a relational database 101 a logging facility 102, a locking facility 103 and a cross system coupling facility (XCF). The operating system 105 can further include a multiple virtual storage (MVS) services layer 107 and a message facility layer 108. The system 100 can further include a coupling facility (CF) 110 having a CF structures layer 111, a link subsystem 112 and a message architecture extensions layer 113. In an exemplary embodiment, a transport layer 115 is disposed between and couples the operating system 105 and the CF 110. In an exemplary implementation, the transport layer 115 implements InfiniBand. FIG. 1B illustrates an example of a multi-tasking multi-processor environment. The example shows three mainframes A, B, C connected into a two different Parallel Sysplex environments using the previous generation of coupling transports. zOS A, zOS B and zOS F are all tied together through a Coupling Facility (CF1). zOS C and zOS D are tied together through CF2. Meanwhile zOS E is a stand alone operating system. In this configuration separate channels are connected through separate adapters in the separate frames. It is appreciated that multiple internal channels 116, 117, 118 include separate external connections 120. FIG. 1C illustrates an example of a multi-tasking multi-processor environment in accordance with an exemplary embodiment. In this example, multiple internal channels 121, 122, 123 share the same physical connection 125. FIG. 1 D illustrates an example of a multi-tasking multi-processor environment 150 in accordance with an exemplary embodiment. The environment 150 can include one or more channels 155, each channel including command/response areas 156, data buffers 157, receive/send queues 158 and adapters 160 for mapping the channels 155 to ports 161 and ultimately communication links 162, as discussed further herein. The channels 155 can further include queue pairs 159 as discussed further herein. The system 150 can further include control code 165 having functions including but not limited to: rendezvous 166, auxiliary queue 167, channel 168, discovery 169 and subnet administrator 170.

In an exemplary embodiment, each emulated channel is represented by a virtual channel identifier since there is no longer a physical identifier that represents the channel. In addition, the physical channel includes multiple link buffers allowing for multiple concurrent operations. In the emulated channel, each of the multiple link buffers is represented by a queue pair per link buffer. As link speeds increase, more buffers can be added to increase link utilization. Furthermore, there is at least one additional auxiliary queue pair, which handles channel path management: connection establishment with the remote system, heartbeat, invalidating of requests and other recovery actions, etc. In an exemplary embodiment, completion queues and event queues are also established to receive different types of completion and unsolicited events.

In an exemplary embodiment, a coupling channel protocol is a connection-oriented request-response model, and is emulated implementing a connected service of the standardized protocol. The request-response is implemented to minimize link transfers, thereby optimizing performance. Furthermore, there are dedicated data buffers, which are used to receive the request and any associated data so that both command and data messages can be sent in quick succession. Both are then moved to their final location. In an exemplary implementation, the receiver side receive-queue is primed with two work requests: one for the command or request and the second for any potential data. If there is no data, a second zero-data-length request is sent to consume the second work request on the receive-queue. The sender side receive-queue is primed with differing numbers of work requests based on the actual command and its expected response. The sender side sends at least two requests: a command request and a data request, which can sometimes be zero-length. The receiver sends at least a command response but may also send one or more data requests depending on the type of command and its required response.

Since the transport layer can support many hundreds or thousands of queue pairs, it is possible to implement many channels on one link. The ability to implement many channels on a single link simplifies configuration since only two links are needed for redundancy regardless of the number of logical partitions instantiated on each side of the links.

Figure 2:
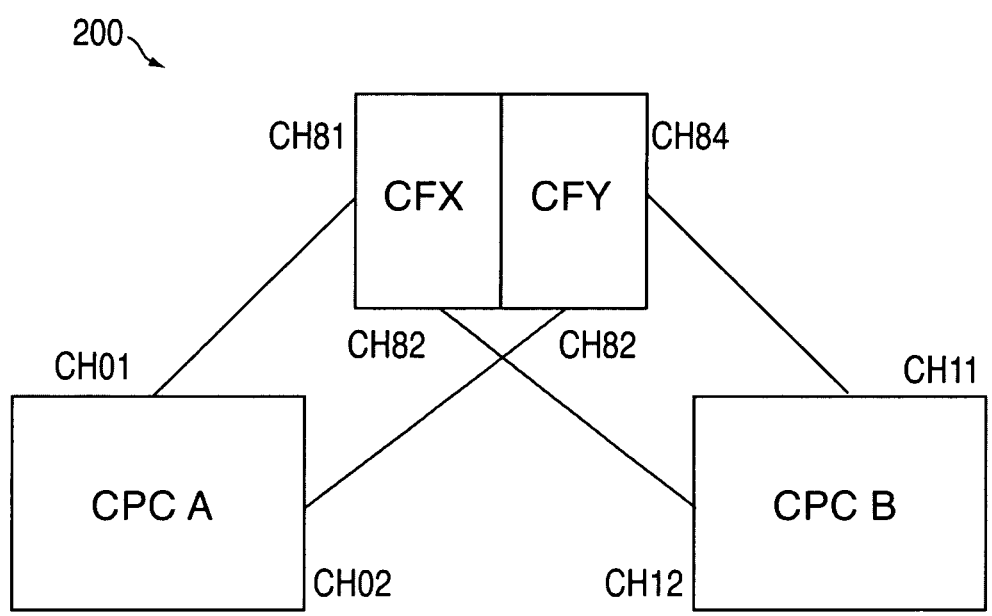
FIG. 2 illustrates a block diagram of an example of a requirement to specify a connected end node in accordance with an exemplary embodiment.

FIG. 2 illustrates a block diagram of an example of a requirement to specify a connected end node in accordance with an exemplary embodiment. A central processor complex (CPC) A includes a control unit defined with a channel CH01 and another control unit defined with a channel CH02. CPC B includes a control unit with a channel CH11 and another control unit with a channel CH12. If the connected channel path identifiers are assigned arbitrarily, the proper configuration could be very difficult to determine. The channel subsystem at the coupling facility (CF) would need to know the control unit configuration at all attached senders in order to make decisions for the channel path connections.

In an exemplary embodiment, the systems and methods defined herein identify the connected node in the definition of the link. A "connected system name" is implemented to identify the system to which the channel path connects. The "connected system name" is an installation-unique value that may be assigned either by the customer or automatically by I/O configuration tools like hardware configuration definition (HCD). In an exemplary implementation, the "connected system name" field is eight bytes long. In an exemplary embodiment, after the node has been identified, the systems and methods described herein then identify the aggregate of queue pairs that constitute the remote end of the link. The aggregate of queue pairs that is tagged with the channel path identifier (CHPID) for the channel path. Therefore, the definition of an emulated channel path specifies a CHPID for the channel path to which it is connected, as well as the system name.

In an exemplary embodiment, initialization involves first initializing the transport layer and then initializing the emulation layer. In order to connect the channel paths, a rendezvous function is first called before the emulation layer can connect the channel paths on each side. In an exemplary embodiment, initialization occurs via the auxiliary queue.

In an exemplary embodiment, communication management commences when the active party requests a connection to the remote partner by specifying a service ID, the requesting queue pair, and private data. In an exemplary embodiment, the active party does not specify the target queue pair because it does not know that information. The target queue pair is identified at the passive side when it receives the connection request and matches the request to the appropriate matching queue pair.

Furthermore, the target side determines from the request whether it should accept the connection. Since the emulated channel function has semantic differences for each queue pair, the private data contains this semantic information so that the proper connections can be established. The private data includes source and target system identifiers, source and target channel path identification, and a source queue pair type. In an exemplary embodiment, private data validation is performed by a validation routine that is specific to the service, which is registered either according to the service or according to the connection. In addition to the private data, the port on which the connection request was received is validated by the validation routine.

In an exemplary embodiment, the communication manager keeps controls for all of the connections that it can manage. In an exemplary embodiment, no implicit correlation exists between communication management controls and queue pair controls. There are alternatives for communication management. In order to maintain proper isolation of function, so that the communications manager may support other protocols in addition to Parallel Sysplex, the communications manager manages the connections in a generic way. This means that the communications manager is not aware of the use of the queue pairs, but simply manages them with respect to the need to interface to the hardware. In an exemplary embodiment, the communications manager is insulated from the semantics of the emulated channel service by the communication manager searching the communication manager table of connections, trying each connection in turn when the communication manager receives a connection request. For each entry in the table of connections, the communication manager calls the routine to validate the private data. If the validation routine returns that the connection is not valid, the validation routine moves to the next entry. This process can be cumbersome if all the queue pairs for each channel path are awaiting connections, since the communication manager tries each one in turn, but none of them works. In order to properly isolate the function, upon receiving a connection request, the communications manager passes the data to validation functions on behalf of each of the channel paths awaiting connections. When one of the validation functions identifies the connection request as representing its partner, based upon the private data, it responds to the communications manager indicating its acceptance of the connection request. In an exemplary embodiment, the communication manager calls a validation routine that returns the correct queue pair to try. Upon an indication of acceptance of the connection, the communications manager sends a message to the requesting source, including the identifying target queue pair associated with the identified recipient. In another exemplary embodiment, a single connection at a time is initialized for each channel path. As such, the private data validation routine initializes the next connection if it determines that the connection request is to be honored. In an exemplary embodiment, communication management includes timing requests. The communication manager must time its operations to ensure that a connection request is not left hanging indefinitely.

In an exemplary embodiment, the auxiliary queue manager supports one queue pair per emulated channel, each of which serves as the conduit for a variety of out of band channel control messages. For example, there is one auxiliary queue pair per emulated channel. The auxiliary queue pair is used to manage the channel from initialization through destruction. It does this by exchanging messages between the auxiliary queue managers on either end of the link. Among the messages that are exchanged are the Negotiate Buffers (determine the characteristics of the channel), Exchange Node Descriptors (send identifying information about the channel), Loss Of Link (notification that the link is being brought down), Invalidate Buffer Request (cancel an operation on a specific queue pair), Invalidate Buffer Response (an acknowledgment of an Invalidate Request), and Heartbeat (a message to confirm that the channel is still viable). In an exemplary embodiment, auxiliary queue pairs are reliable connected message pathways by which the out of band messages may be communicated without the need for the auxiliary queue manager code being concerned about the details of the delivery mechanism. Since the architecture is layered, the communications manager and hardware beneath ensure that all messages are delivered correctly and in the order in which they were sent. This relieves the auxiliary queue manager from the need to concern itself with the details of message delivery, so that it can concern itself with the operation of the channel. The out of band signals and messages that are handled include: coupling link initialization including queue pair negotiation (determining the number of queue pairs and other parameters to use when establishing the channel), and node descriptor exchange (providing information that is used by higher layer protocols to understand what system is on the other end of the channel); Loss of Link (recovery related message that specifies NOS—Not Operation Sequence to force logging due to an error condition, OLS—Off Line Sequence to indicate that the link is coming down but no logging is required, and other continuous sequence emulation in support of LOL—Loss Of Link processing; invalidate buffer (request to cancel an ongoing operation on one of the queue pairs belonging to the channel); Invalidate Response (an acknowledgement that the cancel request was received and acted upon); and heartbeat (a periodic message used to assure the remote partner that the link is still operational).

In an exemplary embodiment, since there are multiple message types that are transferred across the auxiliary queue pairs, the messages include a well-defined structure. In addition, the messages include a set of identifying information to distinguish the message types from one another. As such, the messages include a message type field, a message flags field, and message type dependent data.

The following illustrates an example of the Structure of an auxiliary queue message in accordance with an exemplary embodiment:

| Msg type | Msg flags | Command specific data |
| --- | --- | --- |

In the above example, Msg type identifies the request, Msg flags contains flags relevant to the message type and Command specific data is other data needed by the specific command. In an exemplary embodiment, the following illustrates the format of the Invalidate Request message:

| Msg type | Msg flags | Target buffer |
|---|---|---|
| Sequence number | Work Queue Count | |

In the above example, the Msg type would indicate Invalidate Request. The Msg flags would indicate whether this request was due to a time out (operation is taking too long) or because the operator or program was encountered a situation where stopping the processing is required. Target buffer identifies the specific buffer or queue pair whose operation is being cancelled. Sequence number is used to ensure that we are canceling the correct operation since it is possible for the Invalidate to arrive prior to the actual buffer request being processed. Finally, Work Queue Count may be used to indicate the number of receive queue work elements that were posted on the originator side for this operation. This information is needed so that those work queue elements may be cleared.

to complete the negotiation process. In an exemplary embodiment, there must be enough work queue elements and other resources to enable the auxiliary queue manager to exchange information with its remote partner. The number may only be two or three work queue elements for the send and receive queues. However, without those resources, no negotiation or information exchange can take place. In addition, the receipt of a completion event for each auxiliary queue work queue element is required. Whenever data is received into an auxiliary queue work queue element, it is necessary to force an entry to be made in the completion queue associated with the auxiliary queue pair so that the auxiliary queue manager can be made aware of the arrival of a message. Therefore, it is imperative that there not only be enough work queue elements to receive the messages, but that there be enough completion queue elements as well.

The flow shown in the following diagram indicates the exchanges that take place during the initialization of a Coupling channel over InfiniBand once the auxiliary queue pairs are connected:

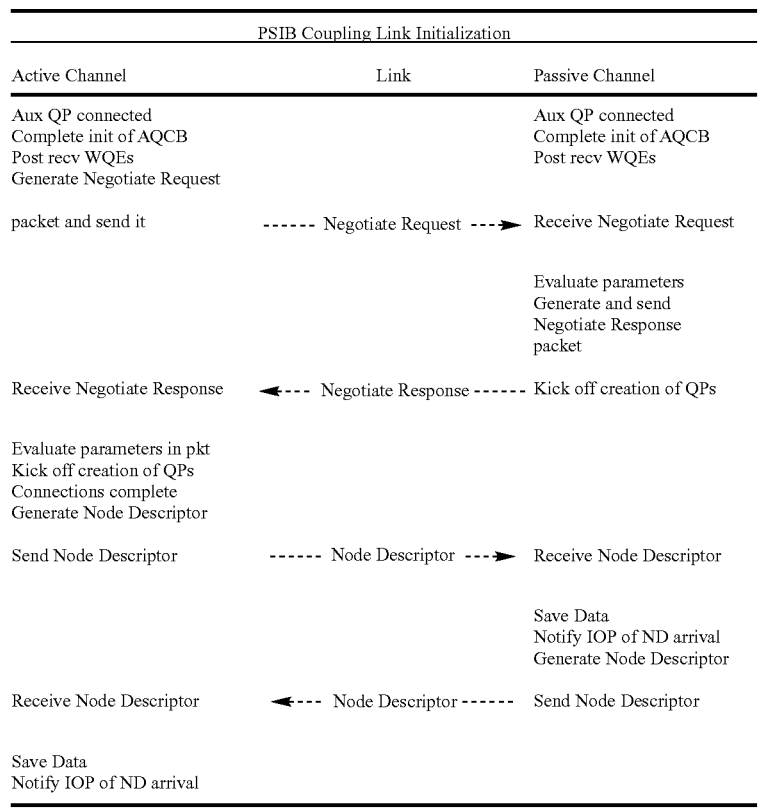

In an exemplary embodiment, the auxiliary queue manager maintains work requests (including data areas) for the emulated channel it represents. The auxiliary queue manager further manages a sufficient number of buffers to handle the negotiated number of non-auxiliary buffers. Additionally, work requests are allocated for sending node descriptor, heart beat and continuous sequence messages. For example, the auxiliary queue must have enough receive queue elements available at all times to handle one Invalidate Request for each buffer in the channel, as well as one each for receiving a heartbeat message and an LOL message, since all of these operations could be in process at the same time.

In an exemplary embodiment, prior to the completion of the negotiation, a sufficient number of buffers is maintained The first step on each side is to initialize the Auxiliary Queue Control Block (AQCB), and post receive work queue elements that will be used for the initial negotiations. At the time the connection is established, the communications manager informs the auxiliary queue manager on each side whether they are to be the active or passive participant in establishing the link. The active side will then generate a Negotiate Request packet, fill in a send work queue element, and request that the communications manager send the packet to the remote partner. Upon receiving this request, the passive side auxiliary queue manager will evaluate the parameters in the request, make the decisions about what it is capable of supporting, and generate and send a Negotiate Response packet. At this point the passive side remains idle, but prepares itself to process the first connection request for the buffer related queue pairs associated with the channel. Upon receipt of the Negotiate Response packet, the active side will evaluate the parameters sent by the passive side. Assuming that the parameter choices are acceptable, the active side will now request the communications manager to connect the first buffer related queue pair for the channel. This request includes data that will enable the passive side to recognize the connection request when it is called to validate the connection request. This process repeats itself until one at a time all of the necessary buffer queue pairs are connected, and prepared for operation. After the last buffer queue pair is connected, the active side will generate a Node Descriptor message, which includes information needed by the higher layer protocols to uniquely identify the connection. The Node Descriptor message is sent to the passive side, which responds by saving that data where the higher layer protocols can access it, notifies the higher layer protocols that the data has arrived, and generates and sends a Node Descriptor message with its own identifying information. The active side, upon receiving the Node Descriptor, will store the data and notify the higher layer protocols. At this point the channel is available for use by the higher layer protocols.

Figure 3:
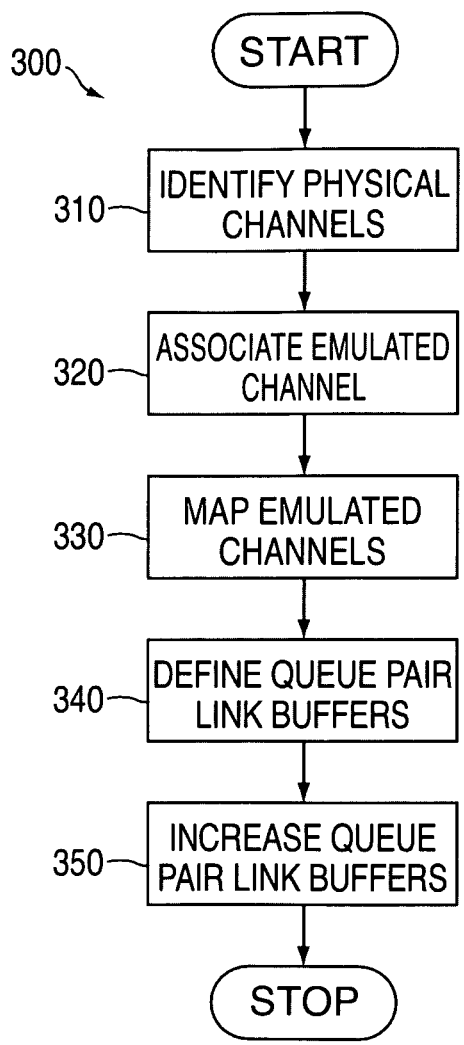
FIG. 3 illustrates a flow chart for a method for emulating physical channels in a multi-tasking multi-processor environment.

FIG. 3 illustrates a flow chart for a method 300 for emulating physical channels in a multi-tasking multi-processor environment. At block 310, the method 300 identifies physical channels having respective physical channel identifiers. At block 320, the method 300 associates an emulated channel for each physical channel. In an exemplary embodiment, each emulated channel includes a virtual channel identifier. At block 330, the method maps the emulated channels on a communications link, thereby generating an emulated channel path for each of the emulated channels. At block 340, the method 300 defines a queue pair link buffer for each of the emulated channels. At block 350, the number of queue pair link buffers can be increased when there is an increase in physical channel capacity, to maintain the level of physical link utilization.

Technical effects of exemplary embodiments include the ability to emulate existing hardware channel semantics in firmware. The behavior of the emulated channel path emulates the behavior of the hardware implemented channel path. Since the semantics are emulated, it is possible to remove the one-to-one association between the channel path and the link, enabling the use of as many channel paths per link as are necessary to keep the link fully utilized. Utilization of the link, the ability to maximize the amount of data on the link relative to the raw capacity of the physical layer, becomes a factor as the link speeds increase over time. As such, the number of channel paths per link can be increased to keep the link utilization high.

Figure 4:
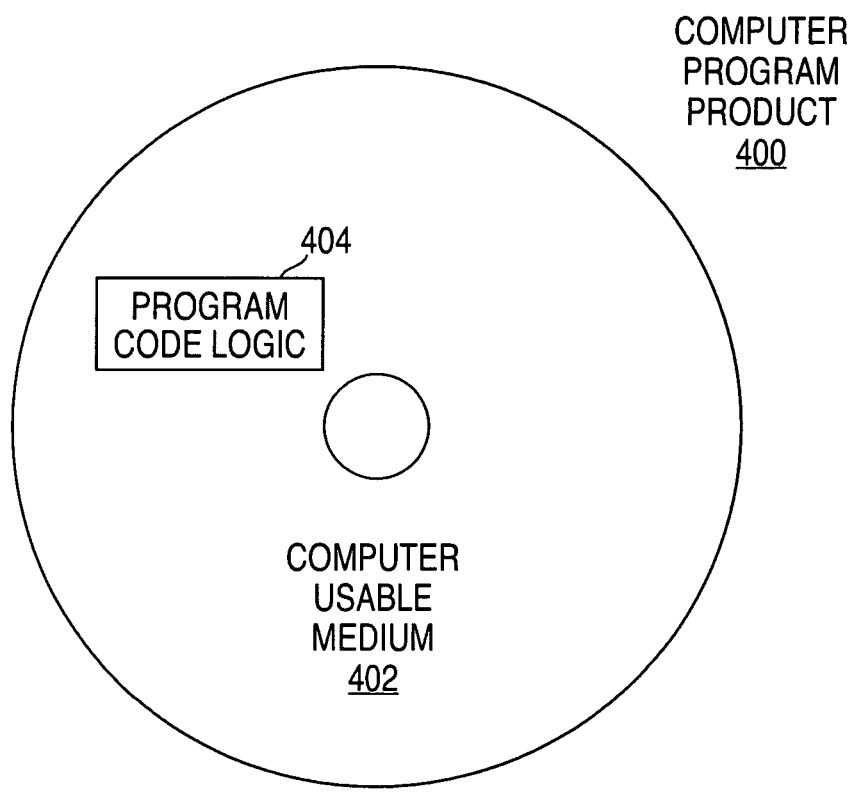
FIG. 4 depicts one embodiment of an article of manufacture incorporating one or more aspects of the present invention.

As described above, embodiments can be embodied in the form of computer-implemented processes and apparatuses for practicing those processes. In exemplary embodiments, the invention is embodied in computer program code executed by one or more network elements. Embodiments include a computer program product 400 as depicted in FIG. 4 on a computer usable medium 402 with computer program code logic 404 containing instructions embodied in tangible media as an article of manufacture. Exemplary articles of manufacture for computer usable medium 402 may include floppy diskettes, CD-ROMs, hard drives, universal serial bus (USB) flash drives, or any other computer-readable storage medium, wherein, when the computer program code logic 404 is loaded into and executed by a computer, the computer becomes an apparatus for practicing the invention. Embodiments include computer program code logic 404, for example, whether stored in a storage medium, loaded into and/or executed by a computer, or transmitted over some transmission medium, such as over electrical wiring or cabling, through fiber optics, or via electromagnetic radiation, wherein, when the computer program code logic 404 is loaded into and executed by a computer, the computer becomes an apparatus for practicing the invention. When implemented on a general-purpose microprocessor, the computer program code logic 404 segments configure the microprocessor to create specific logic circuits.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims. Moreover, the use of the terms first, second, etc. do not denote any order or importance, but rather the terms first, second, etc. are used to distinguish one element from another. Furthermore, the use of the terms a, an, etc. do not denote a limitation of quantity, but rather denote the presence of at least one of the referenced item.

What is claimed is:

1. A computer program product for emulating channels in a multi-tasking multi-processor environment, the computer program product comprising:
   a tangible non-transitory storage medium readable by a processing circuit and storing instructions for execution by the processing circuit for performing a method comprising:
     identifying a plurality of physical channels having an associated physical channel identifier for each of the plurality of physical channels;
     generating a plurality of emulated channels;
     associating an emulated channel from the plurality of emulated channels for each of the plurality of physical channels, each of the plurality of emulated channels having a virtual channel identifier;
     mapping the plurality of emulated channels on a communications link, thereby generating an emulated channel path for each of the plurality of emulated channels, wherein mapping the plurality of emulated channels into the single communications link removes a one-to-one association between any one of the plurality of physical channels and the communications link;
     defining a queue pair link buffer from a plurality of queue pair link buffers for each of the emulated channels, wherein communication in each of the plurality of emulated channels includes private data that includes semantic differences among each of the plurality of emulated channels, the virtual channel identifier for each of the plurality of emulated channels, source and target channel path identification;
     validating the private data to determine if communication in each or the plurality of emulated channels is to be honored; and
   in response to an increase of physical channel utilization, increasing a number of queue pair link buffers and mapping additional emulated channels to the communications link.

2. The computer program product as claimed in claim 1 further comprising initializing a transport layer associated with the plurality of physical channels.

3. The computer program product as claimed in claim 2 further comprising initializing an emulation layer associated with the plurality of emulated channels.

4. The computer program product as claimed in claim 3 wherein initialization of the transport layer and the emulation layer occurs via an auxiliary queue.

5. The computer program product as claimed in claim 1 further comprising validating a service associated with one or more of the plurality of the emulation channels.

6. The computer program product as claimed in claim 1 further comprising receiving a communication request.

7. The computer program product as claimed in claim 6 further comprising in response to receiving an acceptance of a connection request, sending a message that includes an identifying target queue pair.

8. The computer program product as claimed in claim 1 further comprising initializing a single connection for each channel path.

9. The computer program product as claimed in claim 8 further comprising initializing a subsequent connection request in response to a determination that a current connection request is accepted.

10. The computer program product as claimed in claim 1 further comprising periodically checking connection requests.

11. An apparatus for emulating channels in a multi-tasking multi-processor environment, the apparatus comprising:
    a control unit defined with a channel in the network, the control unit performing a method comprising:
        identifying a plurality of physical channels having an associated physical channel identifier for each of the plurality of physical channels;
        generating a plurality of emulated channels;
        associating an emulated channel from the plurality of emulated channels for each of the plurality of physical channels, each of the plurality of emulated channels having a virtual channel identifier;
        mapping the plurality of emulated channels on a communications link, thereby generating an emulated channel path for each of the plurality of emulated channels, wherein mapping the plurality of emulated channels into the single communications link removes a one-to-one association between any one of the plurality of physical channels and the communications link;
    defining a queue pair link buffer from a plurality of queue pair link buffers for each of the emulated channels, wherein communication in each of the plurality of emulated channels includes private data that includes semantic differences among each of the plurality of emulated channels, the virtual channel identifier for each of the plurality of emulated channels, source and target channel path identification;
    validating the private data to determine if communication in each of the plurality of emulated channels is to be honored; and
        in response to an increase of physical channel utilization, increasing a number of queue pair link buffers and mapping additional emulated channels to the communications link.

12. The apparatus as claimed in claim 11 wherein the method further comprises:
    initializing a transport layer associated with the plurality of physical channels; and
    initializing an emulation layer associated with the plurality of emulated channels,
    wherein initialization of the transport layer and the emulation layer occurs via an auxiliary queue.

13. The apparatus as claimed in claim 11 wherein the method further comprises validating a service associated with one or more of the plurality of the emulation channels.

14. The apparatus as claimed in claim 11 wherein the method further comprises in response to receiving an acceptance of a connection request, sending a message that includes an identifying target queue pair.

15. The apparatus as claimed in claim 11 wherein the method further comprises initializing a single connection for each channel path.

16. A method for emulating channels in a multi-tasking multi-processor environment, the method comprising:
    identifying a plurality of physical channels having an associated physical channel identifier for each of the plurality of physical channels;
    generating a plurality of emulated channels;
    associating an emulated channel from the plurality of emulated channels for each of the plurality of physical channels, each of the plurality of emulated channels having a virtual channel identifier;
    mapping the plurality of emulated channels on a communications link, thereby generating an emulated channel path for each of the plurality of emulated channels, wherein mapping the plurality of emulated channels into the single communications link removes a one-to-one association between any one of the plurality of physical channels and the communications link;
    defining a queue pair link buffer from a plurality of queue pair link buffers for each of the emulated channels, wherein communication in each of the plurality of emulated channels includes private data that includes semantic differences among each of the plurality of emulated channels, the virtual channel identifier for each of the plurality of emulated channels, source and target channel path identification;
    validating the private data to determine if communication in each of the plurality of emulated channels is to be honored; and
    in response to an increase of physical channel utilization, increasing a number of queue pair link buffers and mapping additional emulated channels to the communications link.

17. The method as claimed in claim 16 further comprising:
    initializing a transport layer associated with the plurality of physical channels; and
    initializing an emulation layer associated with the plurality of emulated channels,
    wherein initialization of the transport layer and the emulation layer occurs via an auxiliary queue.

18. The method as claimed in claim 16 further comprising validating a service associated with one or more of the plurality of the emulation channels.

19. The method as claimed in claim 16 further comprising in response to receiving an acceptance of a connection request, sending a message that includes an identifying target queue pair.

20. The method as claimed in claim 16 further comprising initializing a single connection for each channel path.

\* \* \* \* \*